(12) United States Patent
Schwenk

(10) Patent No.: US 11,772,149 B2
(45) Date of Patent: Oct. 3, 2023

(54) PUNCHING AND CLINCHING OF METAL SHEETS

(71) Applicant: Schaeffler Technologies AG & Co. KG, Herzogenaurach (DE)

(72) Inventor: Wilfried Schwenk, Achern-Mösbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/613,151

(22) PCT Filed: Mar. 27, 2020

(86) PCT No.: PCT/DE2020/100252
§ 371 (c)(1),
(2) Date: Nov. 22, 2021

(87) PCT Pub. No.: WO2020/239161
PCT Pub. Date: Dec. 3, 2020

(65) Prior Publication Data
US 2022/0219223 A1    Jul. 14, 2022

(30) Foreign Application Priority Data

May 27, 2019    (DE) ..................... 10 2019 114 050.1

(51) Int. Cl.
*B21D 39/03*    (2006.01)
(52) U.S. Cl.
CPC ................................. *B21D 39/031* (2013.01)

(58) Field of Classification Search
CPC .... B21D 39/031; B21D 39/035; B21D 28/22; H02K 2201/09; H02K 15/02
See application file for complete search history.

(56) References Cited

U.S. PATENT DOCUMENTS

| 7,268,460 | B2 * | 9/2007 | Mitsui | B32B 15/01 |
| | | | | 310/216.004 |
| 2013/0129411 | A1 * | 5/2013 | Shima | B23K 33/008 |
| | | | | 219/162 |
| 2017/0040850 | A1 * | 2/2017 | Hashimoto | H02K 15/02 |

FOREIGN PATENT DOCUMENTS

| CN | 103052465 A | | 4/2013 | |
| DE | 873237 C | * | 4/1953 | |
| DE | 873237 C | | 4/1953 | |
| EP | 1481795 A1 | * | 12/2004 | ............ B32B 15/01 |
| EP | 1481795 A1 | | 12/2004 | |
| JP | H04127926 A | | 4/1992 | |
| JP | 3031981 B2 | | 4/2000 | |
| JP | 2003231206 A | | 8/2003 | |
| JP | 2006025533 A | * | 1/2006 | |
| JP | 2009072014 A | * | 4/2009 | |

* cited by examiner

*Primary Examiner* — Bayan Salone

(57) ABSTRACT

Metal sheets are connected in that a hole is introduced into metal sheets of a first stack, and a region of metal sheets of a second stack are deformed in a stack direction. The deformed region can be plastically deformed in such a way that there is interlocking of the deformed region with at least one metal sheet lying below same. In embodiments, the hole has a shape with a reduced width at the center.

10 Claims, 1 Drawing Sheet

PUNCHING AND CLINCHING OF METAL SHEETS

CROSS-REFERENCE TO RELATED APPLICATIONS

This application is the U.S. National Phase of PCT Appln. No. PCT/DE2020/100252 filed Mar. 27, 2020, which claims priority to DE 102019114050.1 filed May 27, 2019, the entire disclosures of which are incorporated by reference herein.

TECHNICAL FIELD

The disclosure relates to a method for the punching and clinching of metal sheets.

BACKGROUND

The joining of metal sheets by punching and clinching is known as a variant of the clinching method. With this method, a hole is created in one metal sheet and a region of a metal sheet placed over it is pressed into this hole, resulting in a joint between the two metal sheets. Further metal sheets can be added.

This well-known method is unsuitable for particularly thin metal sheets, such as metal sheets with a thickness of 0.35 mm and below. At such low thicknesses, there is insufficient overlap between the individual metal sheets to ensure an adequate joint strength.

SUMMARY

The object of the disclosure is therefore to provide a method through which metal sheets can be reliably jointed to one another, in particular even when the metal sheets are thin.

This object is achieved by the method described herein. The claims contain advantageous configurations.

In the method for the punching and clinching of metal sheets according to the disclosure, the metal sheets to be joined are divided into two stacks of metal sheets. A hole is created in the metal sheets of the first of the two stacks, for example by punching. In particular, this can be done individually for each of the metal sheets of the first stack. In any case, the holes of the metal sheets are congruent within the stack.

A contour is cut into each metal sheet of the second stack of the two stacks of metal sheets. This can be done individually for each metal sheet of the second stack. The metal sheets of the second stack lie on the metal sheets of the first stack. A region of each metal sheet of the second stack of metal sheets is then deformed in a stack direction, i.e., in the direction of the underlying metal sheets of the first stack and, if necessary, also of metal sheets of the second stack already lying on the first stack. Due to the deformation, the deformed region of a metal sheet, viewed in perpendicular to the stack direction, comes to lie next to the regions of underlying sheets. In particular, the deformed region of a metal sheet of the second stack can penetrate into the hole formed in the metal sheets of the first stack.

The deformed region of a metal sheet of the second stack is also determined by the contour cut into the sheet. The deformation can be done individually for each metal sheet of the second stack. The cutting of the contour into a metal sheet of the second stack and the deformation of the region of this second sheet can be done in one operation by a correspondingly shaped punch. At least the region to be deformed of the metal sheet of the second stack closest to the first stack must be deformed to such an extent that part of the deformed region comes to lie next to each metal sheet of the first stack, i.e., the deformed region must completely pass through the first stack through the holes of the metal sheets of the first stack.

Because the first stack comprises a plurality of metal sheets in which a hole is formed, a deformed region of one or a plurality of metal sheets of the second stack can penetrate sufficiently far into the hole present in the first stack to provide sufficient overall overlap with the metal sheets of the first stack, thereby providing sufficient strength for a reliable joint between the sheets. In this way, even thin metal sheets can be joined together, since the small thickness of the individual metal sheets is compensated for by the stacking of the metal sheets in the first stack and the fact that a region of at least one metal sheet of the second stack completely penetrates the first stack as explained above. In particular, metal sheets with a thickness of 0.35 mm and below can also be joined in this way, at least down to 0.1 mm or even 0.05 mm in thickness.

In a preferred embodiment, the metal sheets of the second stack are plastically deformed during deformation in such a way that an interlocking results between the respective deformed region of a metal sheet of the second stack and at least one underlying metal sheet. The metal sheet below can be a metal sheet of the first stack or a metal sheet of the second stack.

In one embodiment, the hole introduced into the metal sheets of the first stack has an elongated shape with a reduced width at the center.

In one embodiment, the contour cut into the metal sheets of the second stack corresponds to part of a contour of the hole. This is advantageous for deforming the region of the metal sheet of the second stack to be deformed into the first stack.

The disclosure also includes arrangements made of sheet metal which have been joined by the method described herein. Such arrangements are used, for example, and without limiting the disclosure thereto, in rotors of electrical machines or in cores of transformers. Depending on the design of the particular arrangement, the person skilled in the art must select the points at which the sheets are joined by the method according to the disclosure. Given the method according to the disclosure, the person skilled in the art has the freedom to use thinner metal sheets in the design of the respective arrangement than can be joined by punching and clinching according to the state of the art.

BRIEF DESCRIPTION OF THE DRAWINGS

The disclosure and the advantages thereof are explained in more detail below with reference to the accompanying schematic drawings.

The drawings merely represent exemplary embodiments of the disclosure. The drawings are in no way to be interpreted as a restriction of the disclosure to the exemplary embodiments shown.

DETAILED DESCRIPTION

Figure 1:
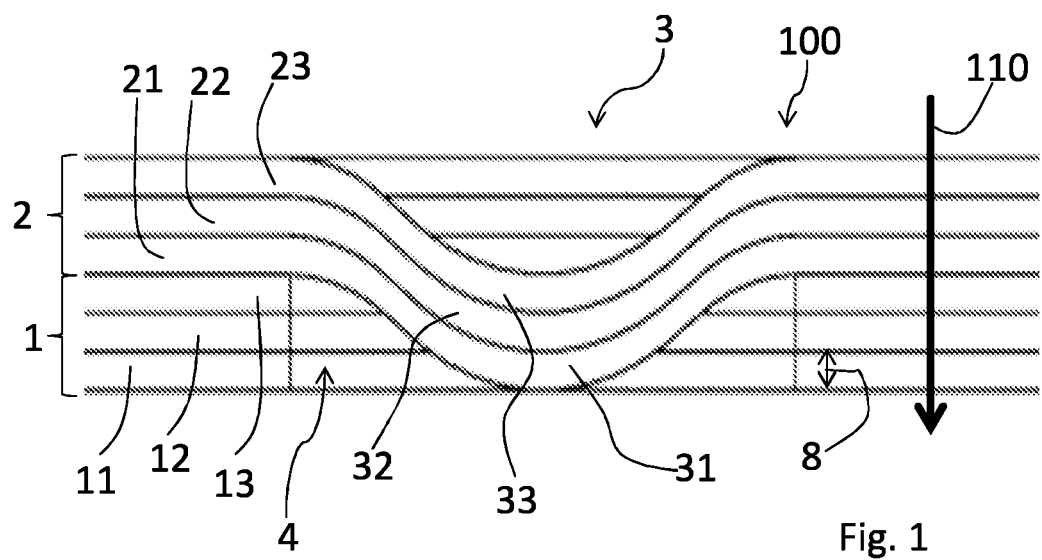
FIG. 1 shows a sectional view through an arrangement of metal sheets joined according to the disclosure.

FIG. 1 shows an arrangement of metal sheets 11, 12, 13, 21, 22, 23. The metal sheets 11, 12, 13 form the first stack 1 of metal sheets for the purposes of this application, the metal sheets 21, 22, 23 form the second stack 2 of metal sheets for the purposes of this application. In a connecting region 3, a hole 4 is cut into the metal sheets 11, 12, 13 of the first stack 1, and the regions 31, 32, 33 of the metal sheets 21, 22, 23 of the second stack 2 are deformed in such a way that they can penetrate this hole 4. In particular, the region 31 of the metal sheet 21 completely penetrates the hole 4 and is therefore adjacent to all the metal sheets 11, 12, 13 of the first stack 1 in the connecting region 3. The deformation of the regions 31, 32, 33 occurs in the direction of a stack direction 110, which forms a normal direction to the undeformed metal sheets stacked on top of one another. A thickness 8 of a metal sheet 11 is also indicated.

Figure 2:
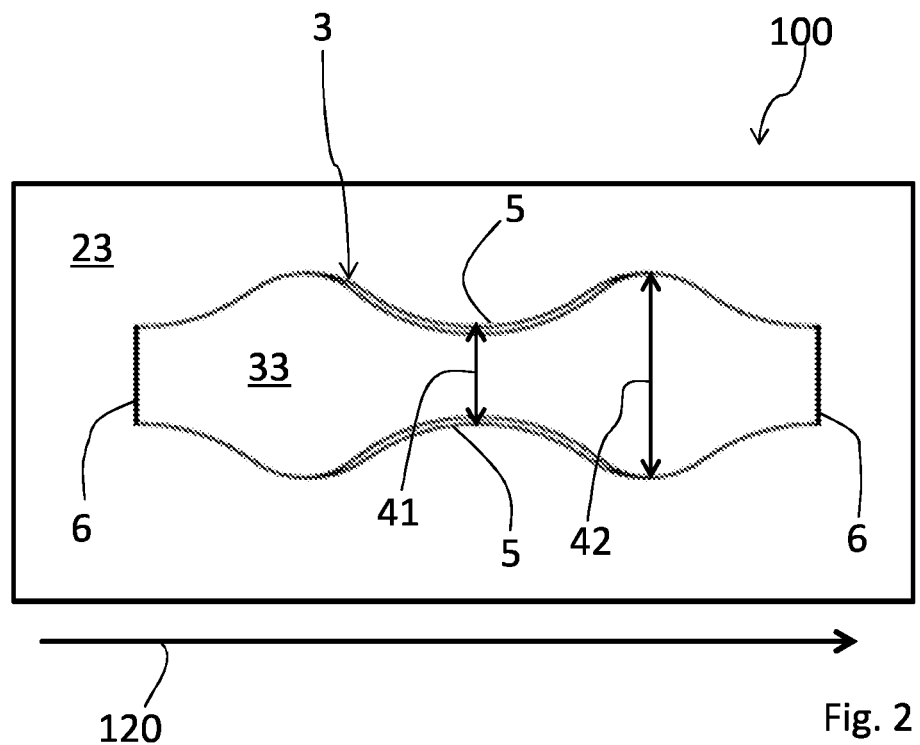
FIG. 2 shows a plan view of an arrangement of metal sheets joined according to the disclosure.

FIG. 2 shows a plan view of the arrangement 100 from FIG. 1, the stack direction 110 being directed into the plane of the drawing here. Correspondingly, a part of the uppermost metal sheet 23 and its deformed region 33 are shown. The cross-sectional shape of the hole 4, perpendicular to the stack direction 110, corresponds to the plan view of the region 33. The deformation of the regions 31, 32, 33 corresponding to this shape is achieved by cutting contours 5 into the metal sheets 21, 22, 23 which correspond to the shape of the hole 4. The contours 5 do not form a closed curve, and no cut is made in the region of the deformation edges 6. The hole 4 (and accordingly the deformed region 33) extends along a direction 120. In the embodiment shown, the hole 4 is elongated, its dimension in the direction 120 being greater than any of its dimensions perpendicular to the direction 120 in the plane of the metal sheet. Along the extension of the hole 4 in the direction 120, a width 41, i.e., an extension perpendicular to the direction 120, of the hole 4 is reduced at the center, i.e., is smaller than a width 42 of the hole 4 at another position along the direction 120. In the embodiment shown, the hole 4 has a symmetrical, fitted shape. The reduced width of the hole 4 and the deformed regions 31, 32, 33 favors a plastic deformation of the deformed regions 31, 32, 33 and thus a more reliable joining to the metal sheets 11, 12, 13 of the first stack 1.

LIST OF REFERENCE NUMBERS

1 First stack
2 Second stack
3 Joining region
4 Hole
5 Contour
6 Deformation edge
8 Thickness
11, 12, 13 Metal sheet
21, 22, 23 Metal sheet
31, 32, 33 Deformed region
41 Width
42 Width
100 Arrangement
110 Stack direction
120 Direction

The invention claimed is:

1. A method for punching and clinching metal sheets, comprising at least the following steps:
    stacking a first plurality of metal sheets in a first stack and a second plurality of metal sheets in a second stack;
    arranging the metal sheets of the second stack on top of the metal sheets of the first stack;
    punching a hole in the metal sheets of the first stack of metal sheets;
    cutting a contour into a region of the metal sheets of the second stack of metal sheets that corresponds to a shape of the hole;
    clinching the metal sheets of the first stack to the metal sheets of the second stack through plastic deformation of the region of the metal sheets of the second stack in a stack direction of the metal sheets of the first stack lying below the second stack, wherein the region deformed passes through the hole in such a way that a joint is formed therebetween.

2. The method according to claim 1, wherein the metal sheets of the second stack are plastically deformed during deformation in such a way that an interlocking results between the respective deformed region of the metal sheet of the second stack with at least one underlying metal sheet.

3. The method according to claim 1, wherein the hole has a shape with a reduced width at a center.

4. The method according to claim 1, wherein the contour cut into the metal sheets of the second stack corresponds to part of a contour of the hole.

5. The method according to claim 1, wherein the hole in the metal sheets of the first stack of metal sheets is punched individually for each metal sheet of the first stack.

6. The method according to claim 2, wherein the deformation of the region of the metal sheets of the second stack of metal sheets in the stack direction for each metal sheet of the second stack occurs individually.

7. The method according to claim 1, wherein a thickness of one of the metal sheets of the first stack or the second stack is not more than 0.35 mm.

8. An arrangement of metal sheets, comprising:
    a first stack of metal sheets having a hole formed therein, the hole extending inwardly from a top surface of the first stack, and
    a second stack of metal sheets arranged on top of the first stack of metal sheets, wherein a region of the second stack of metal sheets is configured to be deformable in a direction of the first stack of metal sheets in such a way that the region penetrates the hole in the first stack to join the first stack with the second stack.

9. The arrangement according to claim 8, wherein the arrangement is part of a rotor of an electrical machine.

10. The arrangement according to claim 8, wherein the arrangement is part of a transformer core.

\* \* \* \* \*